(12) United States Patent
Uland

(10) Patent No.: US 8,862,107 B2
(45) Date of Patent: Oct. 14, 2014

(54) SYSTEM FOR PRODUCT PACKAGING LEVEL SERIALIZATION

(71) Applicant: WS Packaging Group, Inc., Green Bay, WI (US)

(72) Inventor: David M. Uland, Granville, OH (US)

(73) Assignee: WS Packaging Group, Inc., Green Bay, WI (US)

( * ) Notice: Subject to any disclaimer, the term of this patent is extended or adjusted under 35 U.S.C. 154(b) by 0 days.

(21) Appl. No.: 14/094,186

(22) Filed: Dec. 2, 2013

(65) Prior Publication Data

US 2014/0084056 A1 Mar. 27, 2014

Related U.S. Application Data

(62) Division of application No. 12/996,441, filed as application No. PCT/US2009/045804 on Jun. 1, 2009, now Pat. No. 8,620,287.

(60) Provisional application No. 61/059,517, filed on Jun. 6, 2008.

(51) Int. Cl.
*H04M 3/42* (2006.01)
*H04M 3/493* (2006.01)
*G06Q 10/08* (2012.01)

(52) U.S. Cl.
CPC .......... *G06Q 10/0833* (2013.01); *G06Q 10/087* (2013.01); *G06Q 10/08* (2013.01)
USPC ........................................................ 455/414.2

(58) Field of Classification Search
USPC ....................................................... 455/414.2
See application file for complete search history.

(56) References Cited

U.S. PATENT DOCUMENTS

2009/0082964 A1* 3/2009 Robinson et al. ............. 701/213

* cited by examiner

*Primary Examiner* — Kwasi Karikari
(74) *Attorney, Agent, or Firm* — Brian B. Shaw, Esq.; Thomas B. Ryan; Harter Secrest & Emery LLP

(57) ABSTRACT

A tracking system for food products includes labeled food product packages and labeled containers for transporting the labeled packages to harvest sites. A data-clearing center receives mobile phone communications from the harvest sites for uploading the container codes. Ancillary information collected from the mobile phone communications including the time, date, location, and phone identification is associated with the container codes for linking the labeled food product packages to details of their harvest.

15 Claims, 4 Drawing Sheets

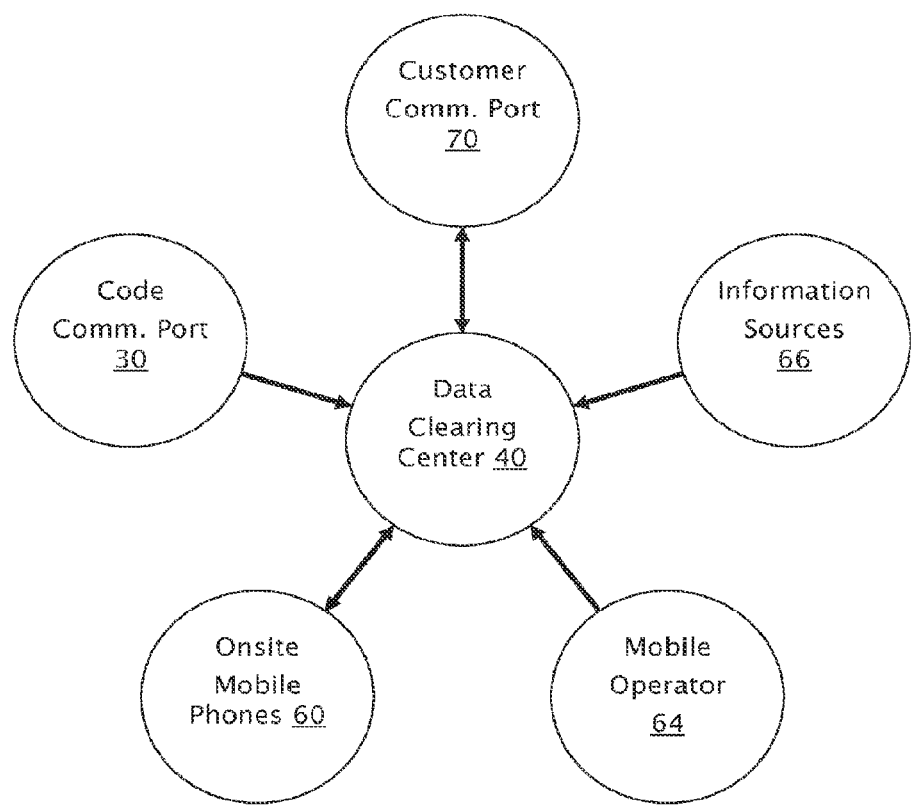
FIG. 3
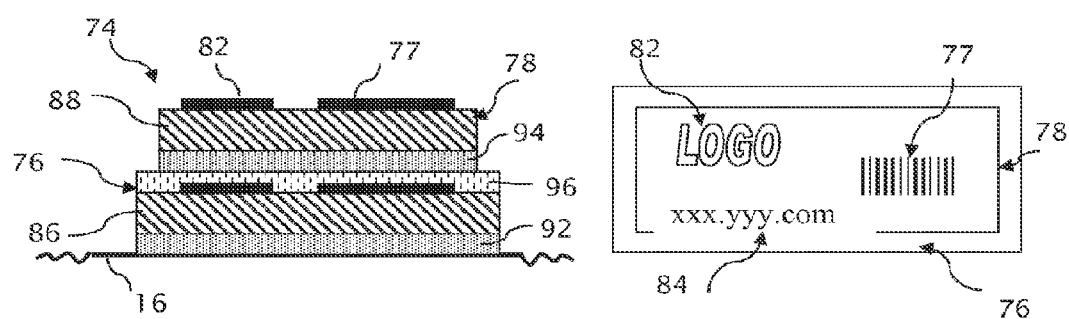
FIG. 4
FIG. 5

SYSTEM FOR PRODUCT PACKAGING LEVEL SERIALIZATION

TECHNICAL FIELD

The invention relates in general to food tracking systems, particularly to such systems that track food into and through food distribution systems.

BACKGROUND OF THE INVENTION

Contaminated foods distributed through, regional, national, or international distribution systems can pose serious health risks for large numbers of people. The contamination can be accidental or deliberate. Once contaminated food has been discovered or suspected, immediate action is necessary to avoid spreading the contamination to a wider population.

Currently, food-tracking systems, particularly for fresh fruit and vegetables, are generally inadequate to precisely identify and isolate potentially contaminated produce. Sometimes, the only recourse is to recall or otherwise destroy the entire inventory of a distributor responsible for one or more brands. Back-tracing shipping records of food products from sales outlets to a common source is time consuming, and the records themselves may lack enough information to identify the particular fields, farms, or growers from which the produce originated. Retailers and consumers may have no choice but to discard all food products from a distributor that have the potential of being contaminated. In the event of a contamination outbreak, the cost to distributors can be very high. Even in the absence of any sort of outbreak, the risk to distributors over the potential loss of their inventory of a food product is ever-present.

SUMMARY OF THE INVENTION

The invention as set forth among its preferred embodiments provides a low-cost food tracking system that exploits the cellular telephone infrastructure already in place throughout this country and around the world for communicating on-site information concerning the initial packaging or harvesting of food products. In addition, the cellular telephone infrastructure also provides information about the location of the communication and the identity of the mobile phone or its assigned user. Time and date information about the communication is available through the cellular telephone infrastructure or from other sources monitoring the communication. Together, this information can be used to record details concerning the origins of food products, such as fresh produce, to more quickly and effectively identify the source of contaminated or otherwise adversely affected food products.

In one version of the invention, produce packages (such as cartons or clamshells) are individually encoded (such as, by the application of labels containing serialized information). The individual produce packages are grouped (e.g., arranged in stacks) and shipped in containers, such as boxes, that can be similarly encoded. The code applied to each container is associated with a sequence or other listing of the codes assigned to the produce packages within each container, such that the identification of a container code also identifies a listing of the produce package codes of the produce packages within the container.

Typically, the containers (e.g., boxes) are shipped to staging areas where they can be accessed by growers (including their harvesting agents) as needed. The growers purchase or otherwise acquire the containers and transport the containers to individual farms or fields for harvesting their produce. The containers are opened on-site, and the individual produce packages (e.g., cartons or clamshells) are distributed to harvesters. Just prior to, accompanying, or just after the distribution of the individual produce packages, a mobile phone, on site, is used to send a voice, text, or graphics message to a data-clearing center, such as through a telephone number or web address, for communicating the code associated with the container brought to a particular farm or field location. At the data-clearing center, the container code is received along with information collected in association with the call itself. For example, the location, time, date, and telephone number of the caller can be recorded in a database along with the container code. Based on a previous association of the container code with the codes of the produce packages within the container, the individually labeled produce packages are also associated with the information collected about the container. The location information can be linked to particular farms or fields; the time/date information, which is indicative of the time of the harvest, can be linked together with the location information to weather or related conditions at the time of the harvest; and the telephone number information can be linked to particular harvesting teams or growers.

Each such product package en route to or reaching a consumer has been registered at the data-clearing center with information concerning the origin of its contents. In the event contamination, spoilage, or other product failing is discovered or even suspected, the source of each questionable food product can be immediately ascertained by submitting the product package code to the data-clearing center or other repository of the information linked to the center. The source or extent of the problem can be more readily determined by identifying patterns among the affected products. For example, all of the contaminated product might be traced to a particular farm or field or to a collection of farms of fields for focusing attention on a commonality, such as a locality, harvesting team, or particular shipper. Any recall can then be more efficiently targeted to only the produce originating from the single farm or field or other commonality deducible from the documented source information.

The early discovery of problems or quality issues involving food products traceable to their source can also lead to a better understanding of the causes of these problems and to a more timely and focused remediation. Higher or at least more consistent food product quality can be achieved in this way.

The ability to trace the origins of food products can also provide retailers and consumers with more information for making food product selections and provide distributors, e.g., brand food companies, with more opportunities for connecting with their customers. For example, interested retailers or consumers can find the date and location where particular produce was harvested. Weather, another related conditions in the area at the time of the harvesting could also be considered. A subscription service can be used to inform interested retailers or consumers about desired products or predefined conditions, such as the harvest from a particular region or farm. An alert system can be used to inform registered consumers of potentially dangerous produce, including the range of codes involved. For example, the registered customer could be given a range of codes for the produce that is on a watch list. The consumers could be provided this information directly or could be advised to contact the distributor, retailer, or other responsible party with access to the database.

Various levels of interactivity are possible at the staging site where the mobile phone call is placed to associate a range of product package codes with a location, time, date, and caller. For example, the crew chief of a harvesting team who initially contacts the data-clearing center could receive a notification as to whether the uploaded container code is recognized as a valid code or could be notified only in the event that the uploaded container code is not recognized as a valid code.

The container code can be uploaded in a number of ways. For example, the container code could be sent by a text message or could be orally transmitted through a regular mobile phone voice call to an automated recording system or a data entry clerk. In the event that an invalid container code is entered, a live or programmed operator could be on standby to intervene to be sure that a correct code is recorded. Return calls could be made in the event of a faulty entry. Picture messaging is also possible. For example, the box code could be recorded in various symbolic formats, including characters, glyphs, bar codes, or other symbols that can be interpreted from an image. Thus, a picture of the container code could be transmitted to the data-clearing center, where the code is deciphered and stored along with the other information available from the call. Again, in the event that the code is not successfully recorded, a return call or other return communication can be placed via the same mobile phone system.

BRIEF DESCRIPTION OF THE DRAWING FIGURES

FIG. 1 is a diagram of a labeling system for encoding individual produce packages and containers within which the product packages are shipped for use.

FIGS. 2A-2F present a series of illustrations depicting steps for distributing and recording the containers, and filling and shipping the product packages.

FIG. 3 is a diagram showing a data-clearing center as a network hub for collecting and disseminating information.

FIG. 4 is a cross-sectional view of a piggyback label mountable on product packaging and including a removable label portion for retaining information independently of the product packaging.

FIG. 5 is a top view of the piggyback label containing printed information for identifying and tracking the product.

DETAILED DESCRIPTION OF THE INVENTION

Figure 1:
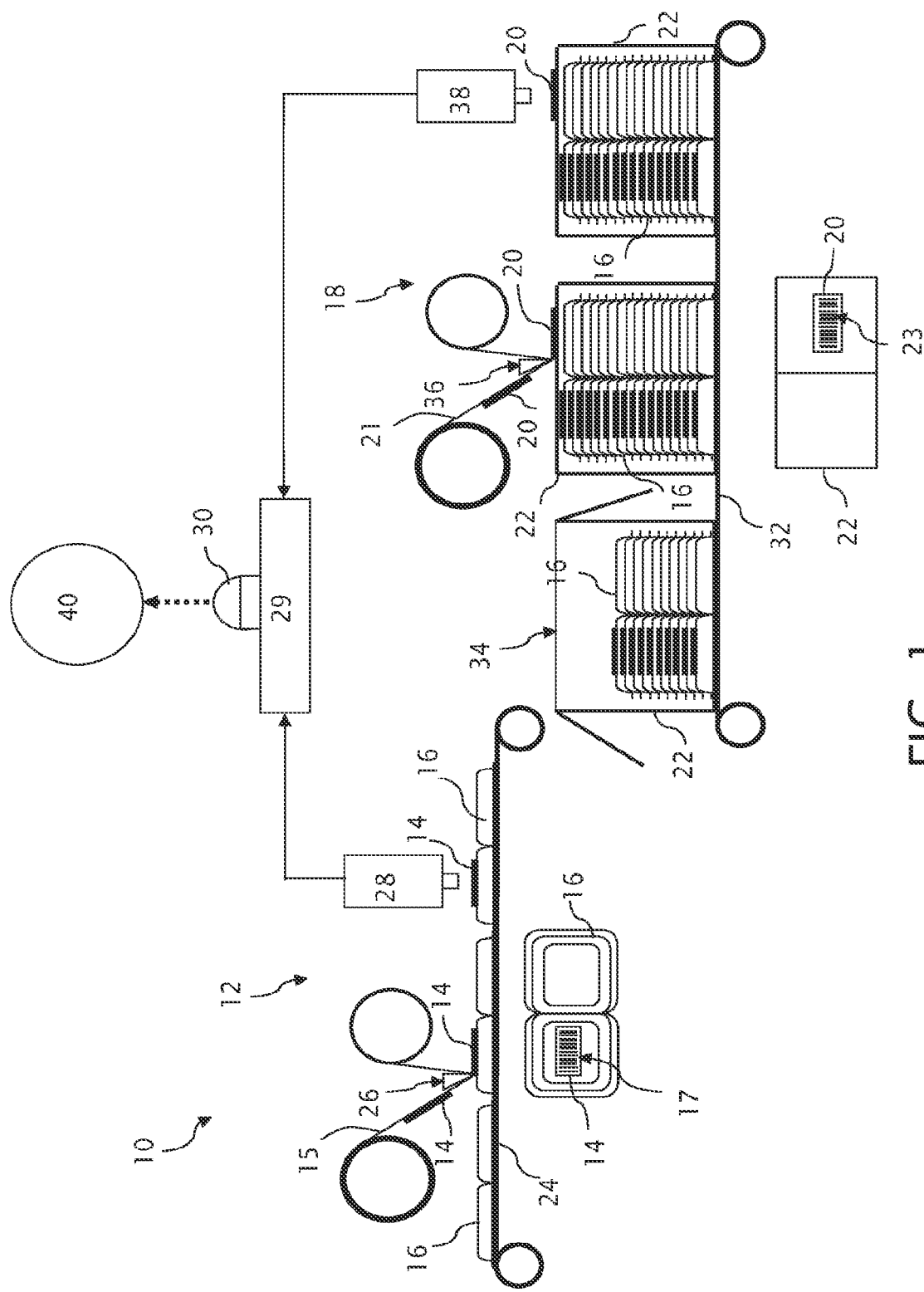

A labeling system 10 as depicted in FIG. 1 includes a first stage 12 that applies encoded labels 14 to a series of product packages 16 (shown as clam shells) and a second stage 18 that applies encoded labels 20 to a series of containers 22 (shown as boxes) for transporting stacks of the product packages 16. A first-stage transporter 24 (shown as a drive belt) advances a succession of the product packages 16 from a supply source (not shown) past a label applicator 26, which applies the encoded labels 14 to the succession of product packages 16. The encoded labels 14 are preferably supplied as a succession of sequentially serialized labels along a continuous web 15. A reader 28, also positioned along the first-stage transporter 24, reads encoded information 17 on the labels 14 applied to the product packages 16 and outputs this information 17 to a local processor 29 and code communication port 30.

The labeled product packages 16 are stacked within the containers 22. A second-stage transporter 32 advances a succession of the containers 22 from a supply source (not shown) to a filling and sealing station 34, where the product packages are stacked within the containers 22, and past a label applicator 36, which applies the encoded labels 20 to the succession of containers 22. The encoded labels 20 are also preferably supplied as a succession of sequentially serialized labels along a continuous web 21. A reader 38, also positioned along the second-stage transporter 32, reads the encoded information 23 on the labels 20 applied to the containers 22 and outputs this information 23 to the local processor 29 and communication hub 30.

The local processor 29 associates the encoded information 17 from sets of product packages 16 received within individual containers 22 with the encoded information 23 on the individual containers 22. Thus, from knowledge of the code 23 on an individual container 22, the codes 17 of the individual product packages 16 within the individual container 22 can be ascertained. Preferably, the labels 14 are encoded in an ordered sequence or other listing so that only the beginning and end of the sequence or other such abbreviated information must be associated with the individual container codes 23 of the labels 20. The ordered sequence of product codes 17 is not necessarily in numerical order but the sequence is preferably known. For example, the labels 14 can be supplied on the web 21 with an ordered sequence of codes 17 so that only the codes 17 of the first and last product packages 16 that enter the individual containers 22 must be read and recorded to identify the entire list of product packages 16 within each of the containers 22. Alternatively, if the containers 22 are arranged to receive one or more stacks of the product packages 16, where each stack comprises a known number of product packages 16 and the product codes 17 are applied to the product packages 16 in a known sequence, then only the product codes 17 of the first or last product packages 16 must be read to identify all of the product codes 17 of the other product packages 16 within each stack. The container codes 23 together with their associated listing of product packaging codes 17 are uploaded or otherwise communicated to a data-clearing center 40 for future use.

Although preferably machine readable, the codes 17 and 23 of the labels 14 and 20 can take various forms including characters, glyphs, bar codes, or other symbols. The codes 17 on the labels 14 and the codes 23 on the labels 20 can take different forms from each other. However, at least the codes 23 on the labels 20 are preferably interpretable from images.

The containers 22 could also be assembled into pallets, skids, or other collections (not shown) that could be similarly encoded and recorded so that the code (not shown) for each such collection is associated with the codes 23 of the individual containers 22 within each collection as well as the individual product packages 16 within each of the containers 22. Although the codes 17 or 23 for the packages 16, containers 22, or collections are preferably applied as pre-printed labels (e.g., pressure-sensitive labels), the codes could also be directly printed, inscribed, embossed, or otherwise encoded directly or indirectly on the packages 16, containers 22, or other collections.

Figure 2A:
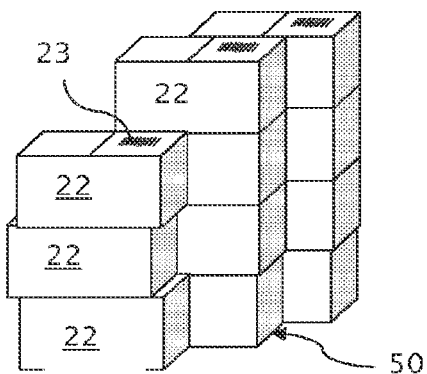
Figure 2B:
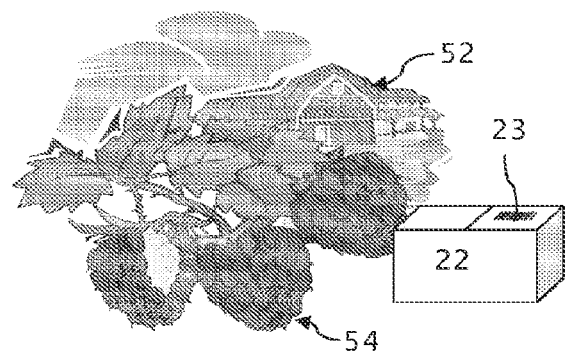

FIGS. 2A through 2F depict a sequence of steps whereby the encoded packaging 16 is used within a system for recording the origins of food products. As depicted in FIG. 2A, the containers 22 filled with stacks of product packages 16 (not shown) are shipped to a staging area 50, where the containers 22 can be accessed by food growers or their agents. As depicted in FIG. 2B, the growers acquire the containers 22 from the staging area 50 and transport the containers 22 to individual farms or fields 52 for harvesting their food products 54 such as produce, depicted as berries.

Figure 2C:
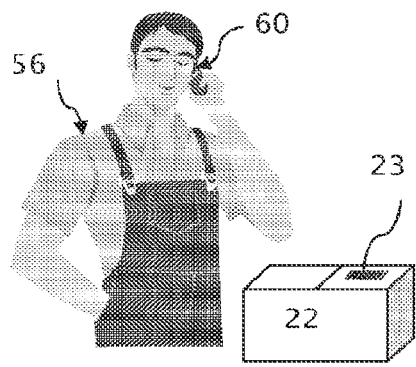

As depicted in FIG. 2C, a farm foreman, crew chief, or other harvesting agent 56 of the grower uses a mobile phone 60, preferably a cell phone unique to the harvesting agent 56, to upload the container code 23 to the data-clearing center 40.

The communication with the data-clearing center 40 (shown in FIG. 1) can take place through a telephone number, web address, or other link. The communication itself can take various forms, including voice, text, or graphics messaging. Preferably, the mobile phone 60 includes a camera, and the grower's agent 56 transmits a picture of the code 23 visible on the on-site container 22. The transmitted image is preferably deciphered at the data-clearing center 40. However, the mobile phone 60 could also include local graphics processing capabilities for performing a deciphering function and uploading the deciphered code 23. Optional feedback can be provided to the grower's agent 56 from the data-clearing center 40. For example, verification could be provided that the container code 23 was successfully uploaded and that the uploaded container code 23 matches a valid code. In the event that an incomplete or invalid container code 23 is uploaded, a live or programmed operator could intervene to provide for re-uploading of the code 23. A return call could also be placed to the mobile phone 60 to provide additional feedback or instructions to the grower's agent 56 or to suggest a different mode for communicating the container code 23.

Figure 2D:
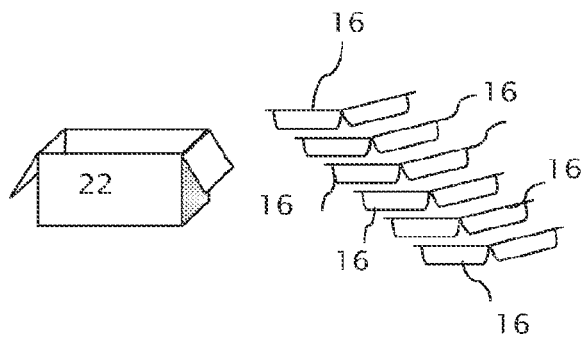
Figure 2E:
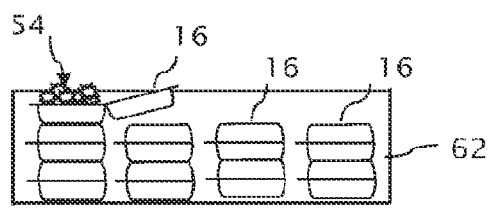
Figure 2F:
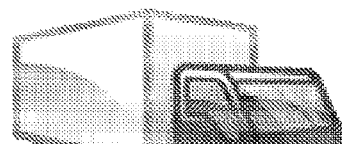

FIG. 2D depicts the opening of the containers 22 and the distribution of the product packages 16 to harvesters for filling the product packages 16 with the food products 54 (e.g., berries). FIG. 2E depicts the collection of the filled product packages 16 into transport containers 62, such as boxes, and FIG. 2F depicts the shipping of the filled containers 62 to retail outlets or distribution sites. The transport containers 62 or collections of such containers 62 can be arranged on pallets, skids, or other transport structures for shipping or temporary storage and can also be separately encoded and linked with their contents.

Although the illustration of FIG. 2C depicts the upload of the codes 23 on the containers 22 before the containers are opened, the upload can also take place during or after the distribution of the product packages 16 but preferably close to the time that the food products 54 are harvested. The mobile phone call for uploading the container codes 23 is also preferably placed at or near the site at which the food products 54 are harvested.

Flows of information to and from the data-clearing center 40 are depicted in FIG. 3. Through the code communication port 30, the data-clearing center 40 collects information relating sets of product packaging codes 17 of the product packages 16 to container codes 23 of the containers 22 in which the product packages 16 are shipped. Through on-site mobile phones 60, the data-clearing center 40 collects information identifying the container codes 23 associated with the on-site harvesting of the food products 54 into the product packages 16. The data-clearing center 40 also preferably collects information from a mobile operator 64, providing the time, date, location, and phone identifier of the caller (e.g., telephone number of the grower's agent 56). The time and date information is, of course, independently available to the data-clearing center 40 as the recipient of the call. In addition, the data-clearing center 40 preferably collects from other sources 66 information such as weather reports, climate data, soil conditions, farm locations, shipping information, or other information bearing on the condition of the food products 54. Processing within the data-clearing center 40 links the collected information. For example, the location information can be linked to particular farms or fields, the time, date, and location information together can be linked to weather or related conditions at the time of the harvest or growing conditions in advance of the harvest, and the phone identifier can be linked to particular harvesting teams or growers. The information from various sources 66 can be linked automatically with the acquisition of the on-site harvesting information (container codes, times, dates, locations, phone identifiers) or such linkages can be made in response to subsequent queries.

A customer communication port 70 supports interactive access to the information gathered or processed at the data-clearing center 40. Information about the contents of individual product packages 16 is accessible throughout the food distribution network to the end consumer. In the event tainted food is discovered or even suspected, the origins and subsequent handling of the food products 54 can be easily traced and patterns linking tainted food products from different retail or distribution outlets can be readily discovered. Any recall of the food products 54 can be limited to a lowest commonality, such as the food products harvested from a particular farm on a particular day. Wider problems are similarly discoverable for effecting larger scale recalls. Sources of contamination or other handling problems, such as issues of freshness, can also be more readily discovered by identifying the level at which the problem is apparent (e.g., a particular farm, region, or time of harvest).

The information acquired concerning the origins of the food products in combination with the ability to track the food products through a distribution system enables the use of premium pricing systems to be implemented, where different prices are charged for food products based on their origins. Orders can be taken for produce (a) originating from particular farms or localities, or (b) meeting certain harvest or shipping parameters (e.g., date, time, weather conditions, or harvest team). Even within the same distribution channels, the produce from organic farms can be automatically distinguished from the produce of non-organic farms by pre-registering information concerning the farms and their locations. In this way, certain retailers, including restaurants, can specify orders for food products meeting certain target parameters such as farm location, farm type, or harvest conditions. Conventional warehouse tracking systems can be used in conjunction with this information for segregating and delivering differently specified products to particular customers or customer sites. Wholesalers can accept individual advance orders to create specialty markets for the more finely distinguished food products.

Although the containers 22 are shown in the sequence of FIGS. 2A-2F as being delivered directly from the staging area 50 to a farm 52 for unloading the product packages 16 at the harvest site, the containers 22 can be emptied at the staging area 50 or at an intermediate site to regroup the product packages 16 into the transport container 62 intended for delivery to retail sites. Labels or other identification means carrying transport container codes can be applied or otherwise associated with the transport containers 62 individually or with a bundled set of the transport containers 62. The product packages 16 are preferably loaded into the transport containers in a form that maintains a known sequence of the product package codes 17. The series of transport container codes can be uploaded into the data-clearing center 40 to supplement or replace the associations previously made with the container codes 23. The upload can be made by a computer connection, mobile phone connection, or other form of communication. At the harvest site, the transport container codes can be uploaded to the data-clearing center 40 in association with the time, date, harvest site, and grower's agent responsible for harvesting of the food product 54.

The labels 14 containing the codes 17 as shown in FIG. 1 can be conventional pressure-sensitive labels or can be arranged in other forms. For example, piggyback labels 74 as shown in FIGS. 4 and 5 include primary and secondary pressure-sensitive labels 76 and 78. Some consumers may choose to discard the packages 16 before the food product 54 (e.g., produce) is consumed. The piggyback labels 74 enable a consumer to remove the secondary pressure-sensitive label 78 containing a package code 77 from a primary pressure-sensitive label 76 affixed to the product packages 16 and to transfer the secondary label 78 to another surface (not shown) such as a refrigerator or other form of register. The removable secondary label 78 provides a convenient way for a consumer to retain access to the origins of the food product 54 without retaining its packaging 16.

The piggyback labels 74 (including the labels 14) could also be arranged (e.g., printed) to display information 82 concerning the distributor or food brand company associated with the food product 54. Address information 84, such as a website address, could also be provided to maintain a closer connection with individual customers. Product promotions and offers could be made to consumers in this way. Loyalty points or other incentive systems could be used to deepen the connection and increase interactivity.

Both the primary and secondary labels 76 and 78 of the piggyback labels 74 are preferably pressure-sensitive labels having respective face sheets 86 and 88 backed by layers of pressure-sensitive adhesive 92 and 94. A release layer 96 on the face sheet 86 of the primary label 76 allows the secondary label 78 to be removed from the primary label 76 and affixed to another surface (not shown). Corresponding printed information including the package code 77 and company information 82 is preferably printed on the face sheet 86 of the primary label 76 so that the product package 16 and any remaining contents 54 remain traceable even after removal of the secondary label 78.

A variety of other types of labels could also be used including single-ply labels with detachable portions that can be backed by a reusable adhesive or can have a non-tacky backing.

The acquired information including the package codes 17 or 77 of the filled product packages 16 can also be used as a basis for tracking the food products 54 through intermediate stages of the food distribution system. For example, the labels 14 or 74 could also be arranged to include an RFID tag that is readily machine-readable.

Figure 6:
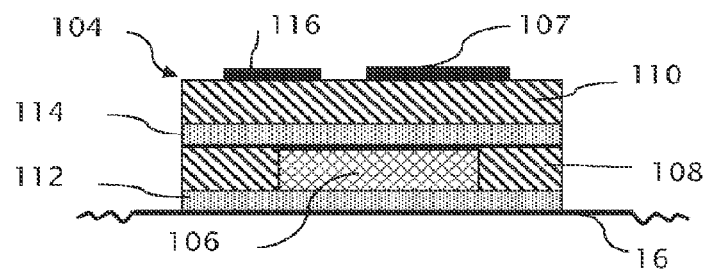
FIG. 6 is a cross-sectional view of a product package or container label with an embedded RFID tag.

FIG. 6 depicts an alternative label 104 having an RFID tag 106 embedded within a substrate 108 beneath a printable face sheet 110. A first pressure-sensitive adhesive layer 112 affixes the substrate 108 together with its embedded RFID tag 106 to the product package 16, and a second pressure-sensitive adhesive layer 114 affixes the printable face sheet 110 to both the substrate 108 and the tag 106. A package code 107 along with other text or graphics 116, preferably identifying the product or its source, is printed on the face sheet 110.

While such RFID technology is likely too expensive to be exploited at the harvesting level, the RFID tags 106 can be used to trace the filled product packages 16 through large warehousing systems. RFID tag codes (not shown) can be linked to the product package codes 107 so that the harvest level data can be associated with data acquired during the further progression of the product packages 16 through the distribution system. At the consumer retail level, both the product package code 107 and the RFID code provide access to information associated with either code. Thus, by pre-linking the RFID tag code with the product package code 107, the two tracking systems can be joined. Since both the product package code 107 and the RFID tag code can be programmed together into the same label 104, the same code can be assigned to both the product package code 107 and the RFID tag code to provide an automatic linkage. For example, the RFID tags 106 can be pre-encoded, read, and the same code printed on the label 104 to provide the initial linkage. Reverse programming is also possible where the RFID codes are programmed to match the printed product package codes 107.

In addition to having various communication links as depicted in FIG. 3, the data-clearing center 40 preferably maintains one or more databases for at least temporarily storing information concerning both the initially uploaded package and container codes 17 (77, 107) and 23 and the subsequently uploaded container codes 23 from harvest sites. Date, time, location, and phone identifier information is also preferably stored in one of the databases in association with the container code 23 uploaded during the call. By previous association, the same information is also linked with the package codes 17 (77, 107) of the packages 16 distributed from the identified container 22. One or more conversion technologies are also preferably provided at the data-clearing center 40 for interpreting or deciphering the container codes 23 from the uploaded voice, text, or graphics information. For example, an uploaded image of a barcode can be converted into a numeric code. Program driven processing is also preferably provided for making additional associations with the package codes 17 (77, 107) including acquiring and relating ancillary information such as weather or soil conditions.

Figure 7:
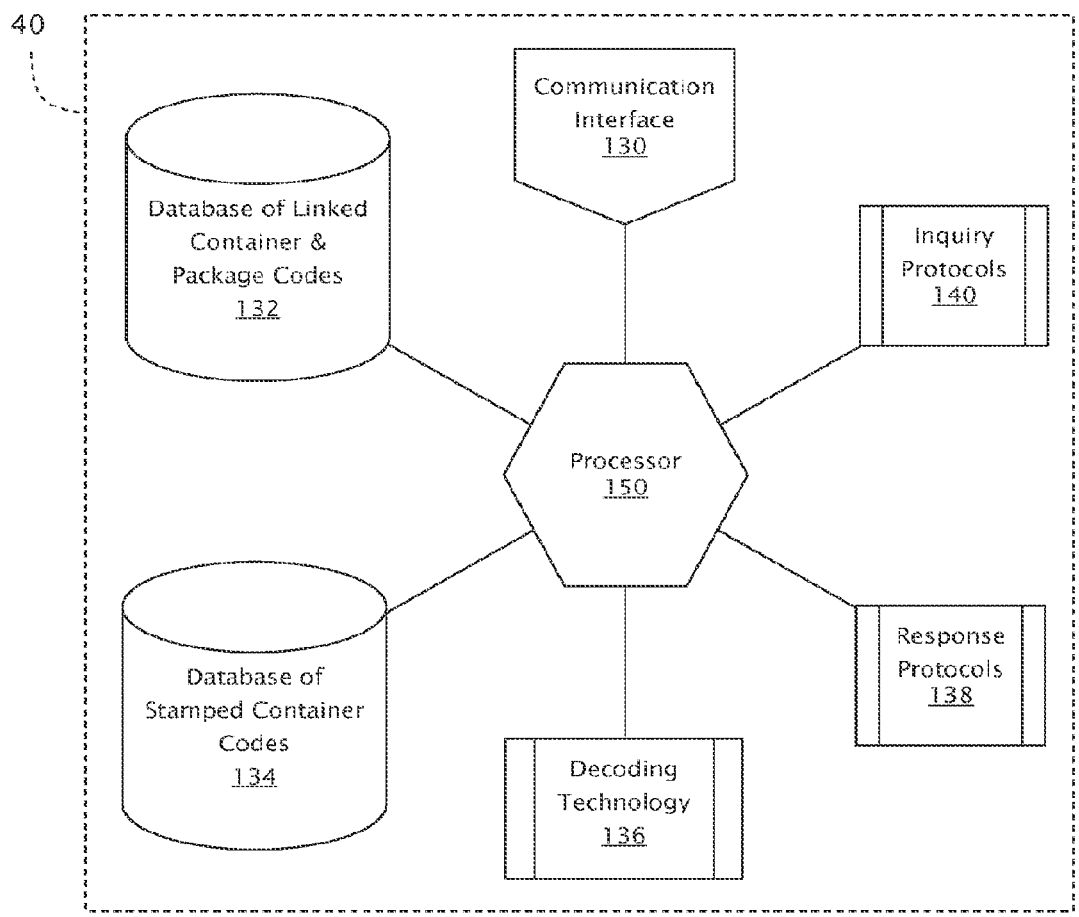
FIG. 7 is a diagram of the data-clearing center.

Within the data-clearing center 40, as shown in FIG. 7, a communication interface 130 completes all of the connections shown in FIG. 3 for gathering and disseminating information. Information acquired through the code communication port 30 is stored in a database 134 of linked package and container codes 17 and 23. Information acquired through the on-site mobile phones 60 and the mobile operator 64 is interpreted and linked together by the processor 150 and stored in a database 134 of container codes 23 stamped by the associated time, date, location, and phone identifier associated with the uploaded the container codes 23. Further associations can be made with the initial processing of the mobile phone communication or later on demand to link the mobile phone location to a particular harvest site, such as a farm, and to link the phone identifier with the grower's harvesting agent. Decoding technology 136 can be used by the processor to decipher or otherwise interpret the uploaded container codes 23. For example, the container codes can be uploaded as camera images, and the decoding technology 136 can be used to convert the images into an alphanumeric form. Response protocols 138 can also be accessed to compare the uploaded container codes 23 with the container codes 23 stored in the database 132 to generate a response through the mobile phone connection, particularly if the uploaded code 23 does not match a stored code 23 or is not within prescribed limits (e.g., as an incomplete code or unrecognizable code). The responses delivered through the mobile phone connection are preferably in the form of an automated text or graphics message, but a computer-generated voice message or even a human initiated call could also be made to the harvesting agent 56 to confirm or advise of a problem with the uploaded code 23. Different protocols, including a hierarchy of responses, can be provided to deal with repeated errors, ranging from succinct to detailed messages and full automation to human intervention.

Customer, subscriber, or other user inquiries are preferably processed according to inquiry protocols 140 for controlling the retrieval or further acquisition of information, processing, and dissemination of information. For example, inquiries can be made concerning the origin of food products associated with one or more product package codes 17. Each product package code 17 can be linked to its associated container code 23 from the database 132, and the container code 23 can be linked to the date, time, location (harvest site, such as a farm), and phone identifier (grower's harvesting agent) associated with the on-site upload of the container code 23 from the database 134. Depending on the inquiry, the date, time, and location information can be used to retrieve additional information about growing or harvesting conditions such as weather or other metrological or climate data, soil conditions, including fertilizer use, and historical information about other food products taken from the same harvest site. Any Information concerning the distribution of the food product from the harvest site to market can also be retrieved from package code 17 or its associated container code 23. The information acquired in response to an inquiry about the package code can then be formatted into a report or other information display and communicated to the customer, subscriber, or other user granted appropriate access to the dataclearing center 40.

Further correlations and associations can be made in response to inquiries containing a plurality of package codes 17. Each of the package codes 17 can be separately traced and further processed to identify commonalities among food products in different product packages 16, including a common location or wider region, a common time or date of the harvest, a common grower, a common harvest agent or team or even common distribution information. Reports of such commonalities can be used to trace the origin of tainted or otherwise suspect food products, allowing more focused recalls based on a listing of the package codes 17 of all affected food products.

The inquiry protocols can also be used for establishing sub-markets for pricing food products differently based on their origins and for accepting orders for food products based on their origins. For example, orders can be placed for food products meeting target descriptions, which can include such distinctions as farm type (e.g., organic or non-organic), region, harvest dates or even orders from particular farms on particular dates. The criteria are matched to listings of the package codes, and the food products within packages matching the listing of package codes are delivered to the customer.

Subscription services could also be provided for automatically notifying customers of recalls of suspect foods or the availability of desired foods. Metrics could also be collected to report on such things as yearly outputs or to identify persistent problems. Feedback from the customers or others in connection with the food products could be used to generate ratings, such as for assessing quality and freshness, of particular farms, regions, harvest dates or other associated information concerning the origins or distribution of the food products.

The product packaging can take a variety of forms in addition to the illustrated clamshell packages 16. For example, the packaging can include bags, crates, cartons, or wraps.

The invention claimed is:

1. A system for capturing product packaging level serialization comprising:
    (a) product package codes applied to a plurality of food product packages along a product package conveyor, the food product packages being empty of food product intended to be packaged,
    (b) a reader for reading at least some of the product package codes applied to the empty food product packages along the product package conveyor,
    (c) container codes applied to containers for transporting the empty product packages,
    (d) a set of the empty product packages to which the product package codes are applied loaded into each of the respective containers to which the container codes are applied, and
    (e) a database that relates the product package codes of the set of empty product packages loaded into each of the respective containers with the container codes of the containers into which the set of empty product packages are loaded.

2. The system of claim 1 in which the product package codes are applied in a known sequence.

3. The system of claim 2 in which the reader reads the product package codes applied to the empty food product packages along the product package conveyer at predetermined intervals so that a sequence of product packaging codes applied to the empty product packages loaded into each of the respective containers is known.

4. The system of claim 1 in which the product package codes are machine readable.

5. The system of claim 1 further comprising a processor for associating the product package codes of the set of empty product packages loaded into each of the respective containers with the container codes of the containers into which the set of empty product packages are loaded.

6. A method for product packaging level serialization comprising steps of:
    (a) packing a plurality of product packages having product packaging codes in a first container in a sequentially related manner, applying a first container code to the first container,
    (b) removing some of the product packages from the first container,
    (c) distinguishing the packaging codes of product packages that are removed from the first container from the packaging codes of the product packages that remain within the first container,
    (d) packing the removed product packages in a second container, applying a second container code to the second container, and
    (e) associating the product package codes of the product packages within second container with the second container code of the second container.

7. The method of claim 6 including a step of transmitting the product packaging codes associated with the second container code together with the second container code for storage in an accessible database.

8. The method of claim 6 including steps of packing the removed product packages in a third container, applying a third container code to the third container, and associating the product package codes of the product packages within third container with the third container code of the third container.

9. The method of claim 6 including a step of comparing the product packaging codes of the product packages within the second container to a set of product packaging codes of the product packages expected to be within the second container.

10. A method for food product packaging level serialization comprising:
    advancing a succession of the food product packages that are empty of food product intended to be packaged,
    applying respective product package codes to the succession of the empty food product packages,
    acquiring identifying information from the respective product package codes applied to the succession of the empty food product packages and outputting the product package identifying information to a processor,
    advancing a succession of containers for transporting respective sets of the empty food product packages, filling each of the containers with one of the sets of the empty food product packages to which the product package codes have been applied, applying respective container codes to the succession of containers, acquiring identifying information from the respective container codes applied to the succession of containers and outputting the container identifying information to the processor, and associating the container identifying information received by the processor from the respective container codes of each of the succession of containers with the product package identifying information received by the processor from the respective product package codes of the set of empty food product packages that fill each of the containers.

11. The method of claim 10 in which the step of advancing the succession of food product packages includes advancing the succession of food product packages along a first-stage transporter toward a filling station and the step of advancing the succession of containers includes advancing the succession of containers along a second-stage transporter toward the filling station, wherein the step of filling each of the containers with one of the sets of the empty product packages takes place at the filling station.

12. The method of claim 10 in which the respective product package codes applied to the succession of the empty food product packages comprise an ordered sequence of codes, and the product package identifying information output to the processor includes the product identifying information of a first and a last of the empty food product packages of each set filled within each of the containers.

13. The method of claim 10 in which the steps of applying respective codes include applying encoded labels to the succession of the empty food product packages and applying encoded labels to the succession of containers, and the steps of acquiring identifying information include reading identifying information from the encoded labels.

14. The method of claim 10 in which the step of filling includes arranging each of the sets of the empty food product packages in one or more stacks within the respective containers.

15. The method of claim 10 including steps of delivering the filled containers to a plurality of harvest sites and uploading the associated identifying information from the containers and the respective sets of empty food product packages within the containers to a data-clearing center accessible from the harvest sites.

* * * * *